United States Patent
Smith

(10) Patent No.: US 10,306,335 B2
(45) Date of Patent: *May 28, 2019

(54) DATABASE DRIVEN COMPUTER SYSTEMS AND COMPUTER-IMPLEMENTED METHODS FOR REAL-TIME PERFORMANCE OF WEB ORIGINATED ACTIVITIES RELATED TO MEDIA EVENTS

(71) Applicant: Monica C. Smith, Parsippany, NJ (US)

(72) Inventor: Monica C. Smith, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,358

(22) Filed: Jan. 12, 2018

(65) Prior Publication Data

US 2018/0139514 A1 May 17, 2018

Related U.S. Application Data

(63) Continuation of application No. 15/395,535, filed on Dec. 30, 2016, now Pat. No. 9,872,084, which is a
(Continued)

(51) Int. Cl.
*H04H 60/33* (2008.01)
*H04N 21/81* (2011.01)
(Continued)

(52) U.S. Cl.
CPC ....... *H04N 21/812* (2013.01); *G06Q 30/0201* (2013.01); *G06Q 30/0246* (2013.01); *H04N 21/23424* (2013.01); *H04N 21/2407* (2013.01); *H04N 21/252* (2013.01); *H04N 21/2543* (2013.01); *H04N 21/25841* (2013.01);
(Continued)

(58) Field of Classification Search
CPC ............ H04N 21/258; H04N 21/2407; H04N 21/2542; H04N 21/2547
See application file for complete search history.

(56) References Cited

U.S. PATENT DOCUMENTS 6,286,005 B1 * 9/2001 Cannon ................. G06Q 30/02
455/2.01
8,768,770 B2 * 7/2014 Kitts ................. G06Q 30/0242
705/14.52
(Continued)

*Primary Examiner* — Pankaj Kumar
*Assistant Examiner* — Timothy R Newlin
(74) *Attorney, Agent, or Firm* — Greenberg Traurig, LLP

(57) ABSTRACT

In some embodiments, the present invention is directed to a computer system which includes: a specifically programmed server, where the server includes a plurality of modules configured to perform at least: electronically and periodically obtaining, over a computer network, media data from a plurality of computer systems of media data sources, where the media data is associated with a plurality of media airings of a plurality creatives; electronically and periodically obtaining web tracking transaction data from a computer system of a web tracking electronic source; where the web tracking transaction data including web tracking metrics for web originated activities; where web originated activities include web orders placed in response to the offer associated with the creative; for each web order record in the transactional web data: attributing, by the specifically programmed server, a particular web order to a particular media airing; and displaying a real time updatable web attribution report.

18 Claims, 9 Drawing Sheets

Related U.S. Application Data continuation of application No. 15/012,595, filed on Feb. 1, 2016, now Pat. No. 9,538,217, which is a continuation of application No. 14/736,017, filed on Jun. 10, 2015, now Pat. No. 9,253,550.

(51) Int. Cl.

| | | |
|---|---|---|
| *H04N 21/234* | (2011.01) | |
| *G06Q 30/02* | (2012.01) | |
| *H04N 21/24* | (2011.01) | |
| *H04N 21/25* | (2011.01) | |
| *H04N 21/442* | (2011.01) | |
| *H04N 21/478* | (2011.01) | |
| *H04N 21/2543* | (2011.01) | |
| *H04N 21/258* | (2011.01) | |
| *H04N 21/41* | (2011.01) | |
| *H04N 21/45* | (2011.01) | |
| *H04N 21/466* | (2011.01) | |
| *H04N 21/84* | (2011.01) | |

(52) U.S. Cl.
CPC ... *H04N 21/25891* (2013.01); *H04N 21/4108* (2013.01); *H04N 21/44222* (2013.01); *H04N 21/4532* (2013.01); *H04N 21/4663* (2013.01); *H04N 21/47815* (2013.01); *H04N 21/84* (2013.01)

(56) References Cited

U.S. PATENT DOCUMENTS

| | | | | |
|---|---|---|---|---|
| 9,872,084 | B2* | 1/2018 | Smith | H04N 21/812 |
| 2003/0101451 | A1* | 5/2003 | Bentolila | G06Q 30/0251 |
| | | | | 725/34 |
| 2008/0235088 | A1* | 9/2008 | Weyer | G06Q 30/02 |
| | | | | 705/14.41 |
| 2009/0030780 | A1* | 1/2009 | York | G06Q 30/02 |
| | | | | 705/14.41 |
| 2011/0231239 | A1* | 9/2011 | Burt | G06Q 30/02 |
| | | | | 705/14.41 |
| 2011/0246267 | A1* | 10/2011 | Williams | G06Q 30/02 |
| | | | | 705/14.4 |
| 2011/0295680 | A1* | 12/2011 | Shaw | G06Q 30/02 |
| | | | | 705/14.44 |
| 2011/0307326 | A1* | 12/2011 | Hsiao | G06Q 30/02 |
| | | | | 705/14.42 |
| 2012/0046996 | A1* | 2/2012 | Shah | G06Q 30/0204 |
| | | | | 705/7.33 |
| 2014/0101694 | A1* | 4/2014 | Canney | H04N 21/2547 |
| | | | | 725/34 |
| 2018/0139514 | A1* | 5/2018 | Smith | H04N 21/812 |

* cited by examiner

| ALL MEDIA AIRINGS IN 8 HOUR WINDOW FROM ORDER TIME (7:52:18A - 3:52:18P) | | | | | |
|---|---|---|---|---|---|
| Source Code | Source Variant Cod | Week Of | Air L Time | Air L Date | Airs L Day |
| Crime & Investigation Network | CRIME | 3/16/2015 | 03:50:00 PM | 3/22/2015 | Sunday |
| CNBC | CNBC | 3/16/2015 | 09:00:00 AM | 3/22/2015 | Sunday |
| CNBC | CNBC | 3/16/2015 | 10:30:00 AM | 3/22/2015 | Sunday |
| KIVI | KIVI | 3/16/2015 | 10:00:00 AM | 3/22/2015 | Sunday |
| KSBI | KSBI | 3/16/2015 | 11:00:00 AM | 3/22/2015 | Sunday |
| KTLA | KTLA | 3/16/2015 | 12:00:00 PM | 3/22/2015 | Sunday |
| WDAY | WDAY | 3/16/2015 | 10:00:00 AM | 3/22/2015 | Sunday |
| WUAB | WUAB | 3/16/2015 | 12:30:00 PM | 3/22/2015 | Sunday |
| WWAY | WWAY | 3/16/2015 | 10:30:00 AM | 3/22/2015 | Sunday |
| Crime & Investigation Network | CRIME | 3/16/2015 | 01:24:00 PM | 3/22/2015 | Sunday |
| | | | | | |
| BELOW AIRINGS ARE REMOVED FROM THE ORDER ATTRIBUTION | | | | | |
| | | | | | |
| HMM | HMM | 3/16/2015 | 02:44:00 AM | 3/22/2015 | Sunday |
| HMM | HMM | 3/16/2015 | 03:21:00 AM | 3/22/2015 | Sunday |
| AS SEEN ON TV | AS SEEN ON TV | 3/16/2015 | 04:00:00 AM | 3/22/2015 | Sunday |
| OXYGEN | OXYG | 3/16/2015 | 04:30:00 AM | 3/22/2015 | Sunday |
| HGTV | HGTV | 3/16/2015 | 05:00:00 AM | 3/22/2015 | Sunday |
| BRAVO | BRVO | 3/16/2015 | 05:30:00 AM | 3/22/2015 | Sunday |
| FYI | FYI | 3/16/2015 | 05:30:00 AM | 3/22/2015 | Sunday |
| KREM | KREM | 3/16/2015 | 06:00:00 AM | 3/22/2015 | Sunday |
| LIFETIME | LIFETIME | 3/16/2015 | 06:00:00 AM | 3/22/2015 | Sunday |
| NATIONAL GEOGRAPHIC | NGC | 3/16/2015 | 06:30:00 AM | 3/22/2015 | Sunday |
| WANE | WANE | 3/16/2015 | 06:30:00 AM | 3/22/2015 | Sunday |
| USA | USA | 3/16/2015 | 07:00:00 AM | 3/22/2015 | Sunday |
| WDTN | WDTN | 3/16/2015 | 07:00:00 AM | 3/22/2015 | Sunday |

FIG. 3

| ALL MEDIA AIRINGS WITH 28:30 LENGTH | | | | | | | |
|---|---|---|---|---|---|---|---|
| Source Code | Source Variant Cod | Week Of | Air L Time | Air L Date | Airs L Day | Offer Code | Unit Length |
| CNBC | CNBC | 3/16/2015 | 09:00:00 AM | 42085 | Sunday | SWNV15A | 28:30 |
| CNBC | CNBC | 3/16/2015 | 10:30:00 AM | 42085 | Sunday | SWNV18A | 28:30 |
| KIVI | KIVI | 3/16/2015 | 10:00:00 AM | 42085 | Sunday | SWNV18A | 28:30 |
| KSBI | KSBI | 3/16/2015 | 11:00:00 AM | 42085 | Sunday | SWNV15A | 28:30 |
| KTLA | KTLA | 3/16/2015 | 12:00:00 PM | 42085 | Sunday | SWNV15A | 28:30 |
| WDAY | WDAY | 3/16/2015 | 10:00:00 AM | 42085 | Sunday | SWNV18A | 28:30 |
| WUAB | WUAB | 3/16/2015 | 12:30:00 PM | 42085 | Sunday | SWNV18A | 28:30 |
| WWAY | WWAY | 3/16/2015 | 10:30:00 AM | 42085 | Sunday | SWNV18A | 28:30 |
| ALL MEDIA AIRINGS WITH 5:00 LENGTH; KEEP ONLY IF WITHIN 4 HOUR WINDOW OF ORDER (11:52:18A - 3:52:18P) | | | | | | | |
| UNHD | UNHD | 3/16/2015 | 12:34:00 PM | 42085 | Sunday | SREM141115A | 00:05:00 |
| ALL MEDIA AIRINGS WITH 2:00/1:00 LENGTH; KEEP ONLY IF WITHIN 2 HOUR WINDOW OF ORDER (1:52:18P - 3:52:18P) | | | | | | | |
| Crime & Investigation Network | CRIME | 3/16/2015 | 03:50:00 PM | 42085 | Sunday | SREM141115B | 00:02:00 |
| Crime & Investigation Network | CRIME | 3/16/2015 | 12:49:00 PM | 42085 | Sunday | SREM141115B | 00:02:00 |
| Crime & Investigation Network | CRIME | 3/16/2015 | 01:24:00 PM | 42085 | Sunday | SREM141115B | 00:02:00 |

Airings highlighted fall out of the 2 hour window. These are to be removed from the pool of potential airings to attribute to.

FIG. 4

| NARROW AIRINGS BY GEOGRAPHIC AREA | | | | | |
|---|---|---|---|---|---|
| In the below example, keep all National Cable airings and remove any airings that do not run in Los Angeles, CA | | | | | |
| | | | | | |
| Source Code | Source Variant Code | Week Of | Air 1 Time | Air 1 Date | Air 1 Day | Market |
| KIVI | KIVI | 3/16/2015 | 10:00:00 AM | 3/22/2015 | Sunday | Boise, ID |
| WIAB | WIAB | 3/16/2015 | 12:30:00 PM | 3/22/2015 | Sunday | Cleveland-Akron(Canton), OH |
| WDAY | WDAY | 3/16/2015 | 10:00:00 AM | 3/22/2015 | Sunday | Fargo-Valley City, ND |
| KTLA | KTLA | 3/16/2015 | 12:00:00 PM | 3/22/2015 | Sunday | Los Angeles, CA |
| CNBC | CNBC | 3/16/2015 | 09:00:00 AM | 3/22/2015 | Sunday | NATIONAL CABLE |
| CNBC | CNBC | 3/16/2015 | 10:30:00 AM | 3/22/2015 | Sunday | NATIONAL CABLE |
| UNIHD | UNIHD | 3/16/2015 | 12:24:00 PM | 3/22/2015 | Sunday | NATIONAL CABLE |
| Crime & Investigation Network | CRIME | 3/16/2015 | 03:50:00 PM | 3/22/2015 | Sunday | NATIONAL CABLE |
| Crime & Investigation Network | CRIME | 3/16/2015 | 12:48:00 PM | 3/22/2015 | Sunday | NATIONAL CABLE |
| Crime & Investigation Network | CRIME | 3/16/2015 | 01:24:00 PM | 3/22/2015 | Sunday | NATIONAL CABLE |
| KSBI | KSBI | 3/16/2015 | 11:00:00 AM | 3/22/2015 | Sunday | Oklahoma City, OK |
| WWAY | WWAY | 3/16/2015 | 10:30:00 AM | 3/22/2015 | Sunday | Wilmington, NC |

| Source Code | Source Variant Code | Week Of | Air Time | Air Date | Airs L Day | Net Media Cost | | Probability of Order Attribution | Rating count in Media Distribution Based on Net Media Cost (%) |
|---|---|---|---|---|---|---|---|---|---|
| CNBC | CNBC | 9/16/2015 | 10:30:00 AM | 9/22/2015 | Sunday | $ | 10,132.00 | 0.365956528 | 37 |
| CNBC | CNBC | 9/16/2015 | 09:30:00 AM | 9/22/2015 | Sunday | $ | 9,997.50 | 0.360919926 | 36 |
| KTLA | KTLA | 9/16/2015 | 12:00:00 PM | 9/22/2015 | Sunday | $ | 4,185.00 | 0.151108276 | 15 |
| LRHD | LRHD | 9/16/2015 | 12:45:00 AM | 9/22/2015 | Sunday | $ | 790.50 | 0.028537865 | 3 |
| WDAY | WDAY | 9/16/2015 | 10:00:00 AM | 9/22/2015 | Sunday | $ | 651.00 | 0.023501263 | 2 |
| WUAB | WUAB | 9/16/2015 | 12:30:00 PM | 9/22/2015 | Sunday | $ | 511.50 | 0.01 | 1 |
| KHN | KHN | 9/16/2015 | 11:00:00 AM | 9/22/2015 | Sunday | $ | 372.00 | 0.013429579 | 1 |
| KSBI | KSBI | 9/16/2015 | 10:30:00 PM | 9/22/2015 | Sunday | $ | 279.00 | 0.010072184 | 1 |
| Crime & Investigation Network | CRIME | 9/16/2015 | 12:45:00 PM | 9/22/2015 | Sunday | $ | 204.60 | 0.007386268 | 1 |
| Crime & Investigation Network | CRIME | 9/16/2015 | 01:24:00 AM | 9/22/2015 | Sunday | $ | 204.60 | 0.007386268 | 1 |
| Crime & Investigation Network | CRIME | 9/16/2015 | 10:30:00 AM | 9/22/2015 | Sunday | $ | 204.60 | 0.007386268 | 1 |
| WWAY | WWAY | 9/16/2015 | 10:30:00 AM | 9/22/2015 | Sunday | $ | 182.75 | 0.006597344 | 1 |

FIG. 7

| Random Assignment | Rank | Source Code | Source Variant Code | Week Of | Air 1 Time | Air 1 Date | Air 1 Day | Net Media |
|---|---|---|---|---|---|---|---|---|
| 0.72 | 80.00 | CNBC | CNBC | 3/16/2015 | 03:00:00 AM | 3/22/2015 | Sunday | $9,997.50 |
| 0.54 | 49.00 | CNBC | CNBC | 3/16/2015 | 03:00:00 AM | 3/22/2015 | Sunday | $9,997.50 |
| 0.19 | 86.00 | CNBC | CNBC | 3/16/2015 | 09:00:00 AM | 3/22/2015 | Sunday | $9,997.50 |
| 0.01 | 100.00 | UNIHD | UNIHD | 3/16/2015 | 12:34:00 PM | 3/22/2015 | Sunday | $790.50 |
| 0.44 | 61.00 | KTLA | KTLA | 3/16/2015 | 12:00:00 PM | 3/22/2015 | Sunday | $4,185.00 |
| 0.65 | 37.00 | CNBC | CNBC | 3/16/2015 | 10:30:00 AM | 3/22/2015 | Sunday | $10,137.00 |
| 0.49 | 58.00 | CNBC | CNBC | 3/16/2015 | 09:00:00 AM | 3/22/2015 | Sunday | $9,997.50 |
| 0.52 | 51.00 | CNBC | CNBC | 3/16/2015 | 10:30:00 AM | 3/22/2015 | Sunday | $10,137.00 |
| 0.81 | 18.00 | CNBC | CNBC | 3/16/2015 | 10:30:00 AM | 3/22/2015 | Sunday | $10,137.00 |
| 0.76 | 24.00 | UNIHD | UNIHD | 3/16/2015 | 12:34:00 PM | 3/22/2015 | Sunday | $790.50 |
| 0.49 | 56.00 | CNBC | CNBC | 3/16/2015 | 10:30:00 AM | 3/22/2015 | Sunday | $10,137.00 |
| 0.31 | 78.00 | CNBC | CNBC | 3/16/2015 | 09:00:00 AM | 3/22/2015 | Sunday | $9,997.50 |
| 0.85 | 10.00 | CNBC | CNBC | 3/16/2015 | 09:00:00 AM | 3/22/2015 | Sunday | $9,997.50 |
| 0.88 | 7.00 | CNBC | CNBC | 3/16/2015 | 10:30:00 AM | 3/22/2015 | Sunday | $10,137.00 |
| 0.76 | 23.00 | CNBC | CNBC | 3/16/2015 | 09:00:00 AM | 3/22/2015 | Sunday | $9,997.50 |
| 0.58 | 42.00 | CNBC | CNBC | 3/16/2015 | 09:00:00 AM | 3/22/2015 | Sunday | $9,997.50 |
| 0.73 | 27.00 | CNBC | CNBC | 3/16/2015 | 03:00:00 AM | 3/22/2015 | Sunday | $9,997.50 |
| 0.66 | 33.00 | CNBC | CNBC | 3/16/2015 | 03:00:00 AM | 3/22/2015 | Sunday | $9,997.50 |
| 0.82 | 16.00 | KTLA | KTLA | 3/16/2015 | 12:00:00 PM | 3/22/2015 | Sunday | $4,185.00 |
| 0.90 | 3.00 | CNBC | CNBC | 3/16/2015 | 10:30:00 AM | 3/22/2015 | Sunday | $10,137.00 |
| 0.90 | 6.00 | CNBC | CNBC | 3/16/2015 | 10:30:00 AM | 3/22/2015 | Sunday | $10,137.00 |
| 0.13 | 92.00 | CNBC | CNBC | 3/16/2015 | 10:30:00 AM | 3/22/2015 | Sunday | $10,137.00 |
| 0.55 | 48.00 | CNBC | CNBC | 3/16/2015 | 09:00:00 AM | 3/22/2015 | Sunday | $9,997.50 |
| 0.85 | 11.00 | CNBC | CNBC | 3/16/2015 | 10:30:00 AM | 3/22/2015 | Sunday | $10,137.00 |
| 0.32 | 75.00 | KTLA | KTLA | 3/16/2015 | 12:00:00 PM | 3/22/2015 | Sunday | $4,185.00 |
| 0.93 | 5.00 | CNBC | CNBC | 3/16/2015 | 10:30:00 AM | 3/22/2015 | Sunday | $10,137.00 |
| 0.96 | 1.00 | CNBC | CNBC | 3/16/2015 | 10:30:00 AM | 3/22/2015 | Sunday | $10,137.00 |

FIG. 8

| Random Assignment | Rank | Source Code | Source Variant Code | Week O | Air L Time | Air L Date | Airs L Day | Net Med |
|---|---|---|---|---|---|---|---|---|
| 0.98 | 1.00 | CNBC | CNBC | 3/16/2015 | 09:00:00 AM | 3/22/2015 | Sunday | $9,997.50 |
| 0.98 | 2.00 | CNBC | CNBC | 3/16/2015 | 09:00:00 AM | 3/22/2015 | Sunday | $9,997.50 |
| 0.98 | 3.00 | CNBC | CNBC | 3/16/2015 | 09:00:00 AM | 3/22/2015 | Sunday | $9,997.50 |
| 0.98 | 4.00 | CNBC | CNBC | 3/16/2015 | 10:30:00 AM | 3/22/2015 | Sunday | $10,137.00 |
| 0.98 | 5.00 | KTLA | KTLA | 3/16/2015 | 12:00:00 PM | 3/22/2015 | Sunday | $4,185.00 |
| 0.98 | 6.00 | CNBC | CNBC | 3/16/2015 | 09:00:00 AM | 3/22/2015 | Sunday | $9,997.50 |
| 0.98 | 7.00 | CNBC | CNBC | 3/16/2015 | 09:00:00 AM | 3/22/2015 | Sunday | $9,997.50 |
| 0.98 | 8.00 | CNBC | CNBC | 3/16/2015 | 09:00:00 AM | 3/22/2015 | Sunday | $9,997.50 |
| 0.98 | 9.00 | CNBC | CNBC | 3/16/2015 | 09:00:00 AM | 3/22/2015 | Sunday | $9,997.50 |
| 0.98 | 10.00 | CNBC | CNBC | 3/16/2015 | 09:00:00 AM | 3/22/2015 | Sunday | $9,997.50 |

FIG. 9

DATABASE DRIVEN COMPUTER SYSTEMS AND COMPUTER-IMPLEMENTED METHODS FOR REAL-TIME PERFORMANCE OF WEB ORIGINATED ACTIVITIES RELATED TO MEDIA EVENTS

RELATED APPLICATIONS

This application is a continuation of U.S. patent application Ser. No. 15/395,535, entitled "DATABASE DRIVEN COMPUTER SYSTEMS AND COMPUTER-IMPLEMENTED METHODS FOR ATTRIBUTING IN REAL-TIME WEB ORIGINATED ACTIVITIES TO MEDIA EVENTS AND TRACKING THE PERFORMANCE THEREOF", filed Dec. 30, 2016, which is a continuation of U.S. patent application Ser. No. 15/012,595, entitled "DATABASE DRIVEN COMPUTER SYSTEMS AND COMPUTER-IMPLEMENTED METHODS FOR PROCESSING REAL-TIME ATTRIBUTION OF WEB ORIGINATED ACTIVITIES TO MEDIA AGENCY RECORDS AND TRACKING THEREOF", filed Feb. 1, 2016 which is a continuation of U.S. patent application Ser. No. 14/736,017, entitled "DATABASE DRIVEN COMPUTER SYSTEMS AND COMPUTER-IMPLEMENTED METHODS FOR PROCESSING REAL-TIME ATTRIBUTION OF WEB ORIGINATED ACTIVITIES TO AIRINGS AND TRACKING THEREOF", filed Jun. 10, 2015, which is incorporated herein by reference in its entirety for all purposes.

TECHNICAL FIELD

In some embodiments, the present invention generally relates to database driven computer systems and computer-implemented methods for processing real-time attribution of web originated activities to airings and tracking thereof.

BACKGROUND

For example, in the realm of Direct Response Television (DRTV), a marketer makes an offer to the viewer to purchase or to inquire about a package of products or services, or to pledge a donation, by visiting a specific URL through individual broadcast airings of a paid commercial program of 28:30 in length (infomercial) or a commercial message of varying lengths equal to or less than five minutes.

BRIEF SUMMARY

In some embodiments, the present invention is directed to a computer system which includes at least the following components: at least one specifically programmed server; at least one non-transitory web attribution database accessible by the at least one specifically programmed server, where the at least one web attribution database is specifically programmed to be dedicated for use by the at least one specifically programmed server; where the at least one specifically programmed server comprises a plurality of modules configured to perform at least the following operations: electronically and periodically obtaining, over the computer network, by a media data programmed computer interface module of the at least one specifically programmed server, media data from a plurality of computer systems of media data sources, where the media data is associated with a plurality of media airings of a plurality creatives; electronically and periodically obtaining, over a computer network, by a web data programmed computer interface module of the at least one specifically programmed server, web tracking transaction data from a computer system of at least one web tracking electronic source; where the web tracking transaction data including web tracking metrics for web originated activities for at least one website associated with at least one offer of at least one creative; where web originated activities comprise web orders placed in response to the at least one offer associated with the at least one creative; for each web order record in the transactional web data: based on an item identifier of at least one item and a price of the at least one item corresponding to a particular web order corresponding to such web order record, determining, the at least one specifically programmed server, at least one particular offer associated with the particular web order, based on the at least one particular offer, determining, the at least one specifically programmed server, a length of a creative which has used for promoting the at least one item; based on the particular offer, identifying, the at least one specifically programmed server, a subset of media agency records in the media data which are potentially attributable to such particular web order; adjusting, the at least one specifically programmed server, a time of airing for each record in the subset of media agency records based on at least one of: i) a predetermined uniform time zone, and ii) an IP address associated with the web order, and iii) a geographic location of a web host at which the particular web order was placed; based on the length of the creative, selecting, the at least one specifically programmed server, a first subgroup of media agency records from the subset of media agency records, where the length of the creative corresponds to a predetermine time window, where the predetermined time window ends at the time of the particular web order, and continues in the past for a predetermined time duration; based on an IP address of the particular web order from the transactional web data, selecting, the at least one specifically programmed server, a second subgroup of media agency records from the first subgroup of media agency records, where the second subgroup of media agency records correspond to media airings shown in a geographic locality of the particular web order; determining, by the at least one specifically programmed server, for each media airing of the second subgroup, a probability of attribution based on cost of such media airing or viewership rating; based on the probability of attribution, duplicating, by the at least one specifically programmed server, a particular media airing record of the second subgroup X times in the dedicated database to obtain a third subgroup, where X is a whole number based on rounding the probability of attribution; assigning, by the at least one specifically programmed server, to each record in the third subgroup a random value within a predetermined number range between Y1 and Y2, where Y2 is larger than Y1; based on the random value, ranking, by the at least one specifically programmed server, each record in the third subgroup so that a particular media airing having the random value which is the closest to Y2 is assigned the highest rank; attributing, by the at least one specifically programmed server, the particular web order to the particular media airing having the highest rank; and displaying, the at least one specifically programmed server, utilizing at least one graphical user interface, a real time updatable web attribution report.

In some embodiments, the at least one specifically programmed server is further configured to: electronically and real-time obtain, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders; where each fulfillment record identifies each fulfillment transaction being associated with a particular web order; and matching, in real-time, records between web records and fulfillment records based, at least in part, on: i) an order date, ii) a 5 digit Zip code, iii) a last name, iv) an order amount, and v) optionally, a street name.

In some embodiments, the at least one web tracking electronic source is selected from the group consisting of: Piwik, Google Analytics, and Omniture.

In some embodiments, the length of the creative corresponds to the predetermine time window based on the following rules: i) when the length of the creative is between 15 and 30 seconds, the predetermined time window is 30 minutes, ii) when the length of the creative is between 60 and 120 seconds, the predetermined time window is 2 hours, iii) when the length of the creative is 5 minutes, the predetermined time window is 4 hours, and iv) when the length of the creative is 28 minutes and 30 seconds, the predetermined time window is 8 hours. In some embodiments, Y1 is 0, and Y2 is 1. In some embodiments, the random value is generated by a random value generator. In some embodiments, the predetermined time zone is selected from the group consisting of: U.S. Eastern time zone, U.S. Central time zone, and U.S. Western time zone.

In some embodiments, the media airing is an airing which is selected from the group consisting of: a television station airing, a radio station airing, a video-on-demand airing, a web-promoted offer airing, and a mobile message airing. In some embodiments, the viewership rating is Nielsen rating.

In some embodiments, the present invention is directed to a computer-implemented method which includes at least the following steps: electronically and periodically obtaining, over the computer network, by a media data programmed computer interface module of the at least one specifically programmed server, media data from a plurality of computer systems of media data sources, where the media data is associated with a plurality of media airings of a plurality creatives; electronically and periodically obtaining, over a computer network, by a web data programmed computer interface module of the at least one specifically programmed server, web tracking transaction data from a computer system of at least one web tracking electronic source; where the web tracking transaction data including web tracking metrics for web originated activities for at least one website associated with at least one offer of at least one creative; where web originated activities comprise web orders placed in response to the at least one offer associated with the at least one creative; for each web order record in the transactional web data: based on an item identifier of at least one item and a price of the at least one item corresponding to a particular web order corresponding to such web order record, determining, the at least one specifically programmed server, at least one particular offer associated with the particular web order, based on the at least one particular offer, determining, the at least one specifically programmed server, a length of a creative which has used for promoting the at least one item; based on the particular offer, identifying, the at least one specifically programmed server, a subset of media agency records in the media data which are potentially attributable to such particular web order; adjusting, the at least one specifically programmed server, a time of airing for each record in the subset of media agency records based on at least one of: i) a predetermined uniform time zone, and ii) an IP address associated with the web order, and iii) a geographic location of a web host at which the particular web order was placed; based on the length of the creative, selecting, the at least one specifically programmed server, a first subgroup of media agency records from the subset of media agency records, where the length of the creative corresponds to a predetermine time window, where the predetermined time window ends at the time of the particular web order, and continues in the past for a predetermined time duration; based on an IP address of the particular web order from the transactional web data, selecting, the at least one specifically programmed server, a second subgroup of media agency records from the first subgroup of media agency records, where the second subgroup of media agency records correspond to media airings shown in a geographic locality of the particular web order; determining, by the at least one specifically programmed server, for each media airing of the second subgroup, a probability of attribution based on cost of such media airing or viewership rating; based on the probability of attribution, duplicating, by the at least one specifically programmed server, a particular media airing record of the second subgroup X times in the dedicated database to obtain a third subgroup, where X is a whole number based on rounding the probability of attribution; assigning, by the at least one specifically programmed server, to each record in the third subgroup a random value within a predetermined number range between Y1 and Y2, where Y2 is larger than Y1; based on the random value, ranking, by the at least one specifically programmed server, each record in the third subgroup so that a particular media airing having the random value which is the closest to Y2 is assigned the highest rank; attributing, by the at least one specifically programmed server, the particular web order to the particular media airing having the highest rank; and displaying, the at least one specifically programmed server, utilizing at least one graphical user interface, a real time updatable web attribution report.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

FIGS. 3-9 depict certain aspects of the present invention in accordance with some embodiments.

DETAILED DESCRIPTION

Figure 1:
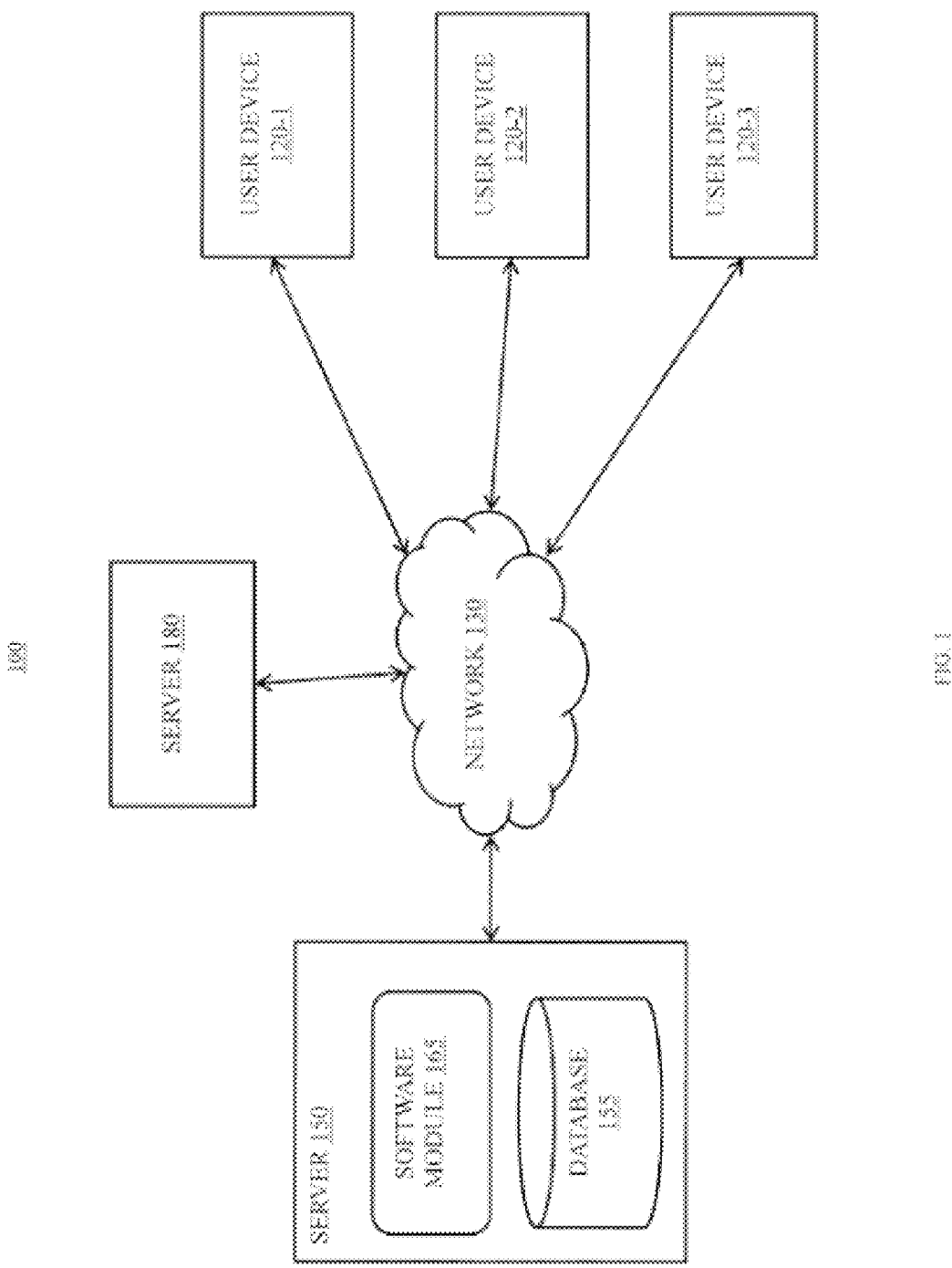
FIG. 1 depicts a block diagram of an exemplary system 100 in accordance with one or more embodiments.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and dynamically. As used herein, the term "real-time" means that an event/action can occur instantaneously or almost instantaneously in time when another event/action has occurred.

As used herein, the terms "dynamic(ly)" and "automatic(ly)" mean that an event/action that can occur without any human intervention. In some embodiments, the event/action may be in real-time and/or hourly, daily, weekly, monthly, annually, etc.

In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

As used herein, the term "creative" means a commercial, published element, display, link and/or advertisement that a consumer sees. For example, for TV, the creative can be an Infomercial or Short Form spots, format lengths (:30/:60/:120) could be interchangeable as a singular creative or they could be separate creatives.

As used herein, the term "offer" represents a particular Product/Service configuration or a package of Products/Services, and/or pricing scheme relative to a specific creative, media agency and/or upsell configuration strategy.

As used herein, the terms "web originated activity" and "web originated activities" represent including, but not limited to, calls, leads, orders, SMS texts, visits, votes, pledges, emails, mail, etc.

As used herein, the term "media source" represents a source, host and/or provider of electronic data regarding an airing (also referenced here as a media airing) which is a media event involving a creative which has been shown/distributed via one or more media outlets, including, but not limited to, TV Stations, Radio Stations, Web Channels/Sites (e.g., youtube.com's channels(s)), Social Sites, Internet streaming (such as service provided by Roku), Satellite, On Demand, emails, mail, publications, inserts, circulars, etc. For example, Roku utilizes a streaming player (or simply Roku) which is a set-top box manufactured by Roku, Inc. Typically, Roku partners provide over-the-top content in the form of channels. As used herein, a particular media event corresponding to a particular airing/media airing is an event that can be defined by time, date, and length parameters. In some embodiments, the media airing is an airing which is selected from the group consisting of: a television station airing, a radio station airing, a video-on-demand airing, a web-promoted offer airing (e.g., banner ads), a mobile message airing (e.g., mobile SMS, email, etc.).

As used herein, the term "campaign" is directed to a set and/or grouping of Creatives targeting a particular marketing effort and/or event. For example, creatives within a campaign can be single or omni-channel.

In some embodiments, an advertisement, creative, is designed to induce consumers to engage in web originated activity(ies).

In some embodiments, a unique airing can be recorded in a database as a record identifying a network or station, day of week and local time.

In some embodiments, the inventive computer systems of the present invention are configured to continuously attribute, in real-time, web originated activities to airings via Direct Response Television (DRTV) (e.g., individual broadcast airings (such as a paid commercial program of 28:30 in length (infomercial)); a series of airings between one and five minutes in which a marketer makes an offer to the viewer to purchase a product, a package of products, a service, or both; 30 seconds commercials, etc.) which asks viewers to visit a specific internet address (e.g., URL, URL encoded 3D barcode, etc.). In some embodiments, the inventive computer systems of the present invention are configured to receive data regarding every airing that is tracked, for example but not limited to, in terms of the TV network/station it ran, day, time, calls, orders, and/or revenue it produced.

Illustrative Example in Accordance with Some Embodiments of the Present Invention when the Web Originated Activity is an Order In some embodiments, the media data is media agency data and at least one media source is an electronic computer system of a particular media agency. In some embodiments, the media agency can be an advertising agency, a network, a station, or any other suitable entity that places, distributes, and/or publishes creatives.

In some embodiments, the inventive computer systems of the present invention are configured to receive, from various media sources, contracted by or on behalf of a marketer (e.g., producer of products or provider of services), media data regarding airings. In some embodiments, the inventive computer systems of the present invention are configured to verify the incoming data and to populate a media data table in a non-transitory database. In some embodiments, the inventive computer systems of the present invention are, similarly, configured to receive and process web data regarding web originated activities (e.g., orders placed on the internet).

In some embodiments, the inventive systems of present invention are configured to process records associated with at least 1 to 1,000 marketers. In some embodiments, the inventive systems of present invention are configured to process records associated with at least 1,000 to 10,000 marketers. In some embodiments, the inventive systems of present invention are configured to process records associated with at least 10,000 to 100,000 marketers. In some embodiments, the inventive systems of present invention are configured to process records associated with at least 100,000 marketers.

In some embodiments, the inventive systems of present invention are configured to process records associated with at least 1 to 1,000 creatives. In some embodiments, the inventive systems of present invention are configured to process records associated with at least 1,000 to 10,000 creatives. In some embodiments, the inventive systems of present invention are configured to process records associated with at least 10,000 to 1,000,000 creatives. In some embodiments, the inventive systems of present invention are configured to process records associated with at least 1,000,000 to 1,000,000,000 creatives. In some embodiments, the inventive systems of present invention are configured to process records associated with at least 1,000,000,000 creatives.

In some embodiments, the inventive systems of present invention are configured to process records associated with at least 1 to 1,000 media outlets. In some embodiments, the inventive systems of present invention are configured to process records associated with at least 1,000 to 10,000 media outlets. In some embodiments, the inventive systems of present invention are configured to process records associated with at least 10,000 to 1,000,000 media outlets. In some embodiments, the inventive systems of present invention are configured to process records associated with at least 1,000,000 media outlets.

Exemplary Web Tracking/Analytics Databases (Piwik, GA, Omniture, Etc.)

In some embodiments, the inventive systems of the present invention combine and validate data for web originated activity records (e.g., records of web placed orders) from a plurality of web tracking sources via, for example, ETL (Extract, Transform, Load)-type processes on, for example, a periodical basis (e.g., Daily Transactional File—24 Hrs.). In some embodiments, the web data is processed in real time through an attribution process that matches web originated activity records to active offers based on a particular SKU (i.e., a stock identification unit such as product or service identification code) and/or a combination of a pre-determined number of SKUs associated with each web originated activity record (e.g., a single item web order record would include a single SKU code). For example, a unique KitCode identifier for a particular active offer is recorded in a particular field in a database table and represents two or more SKUs based on an association table between the unique KitCode identifier and the two or more SKUs.

Exemplary Web Attribution Data Processing Based, at Least in Part, at Least One Source of Web Originated Activity Data Analytics In some embodiments, the inventive systems of the present invention performs web attribution processing utilizing a single electronic data source for web originated activity data analytics. In some embodiments, the single electronic data source for web originated activity data analytics can be selected from the group of Piwik (www.piwik.org), Omniture/Adobe Marketing Cloud (http://www.adobe.com/marketing-cloud.html), Premium Google Analytics (http://www.google.com/analytics/premium/), and any other similarly suitable electronic data source for web originated activity data analytics. The specific web tracking protocols and corresponding specific data structures of each of the above identified electronic data sources, including any of their future modifications, as at least described at identified web locations, are hereby incorporated by references in their entirety for such purpose.

In some embodiments, an exemplary data structure for web originated activity data analytics of a particular electronic data source can have the following fields: Data Provider, Client, Landing Page URL, Order Number, Order Date, Order Time, Time zone, Disposition, Referral Type, Referral URL, # of Pages Viewed, Time On Website, Bounce Rate, Shopping Cart Status, Max Items in Shopping Cart, Email Address, Date of Landing, Time of Landing, Browser, Device Name, Webuser Country, Webuser State, Webuser City, Items in Cart at Checkout, # of Unique Visits in the Past, Billing Name First, Billing Name Last, Billing Address 1, Billing Address 2, Billing City, Billing State/Province, Billing Country, Billing ZIP/Postal Code, Billing Phone Number, Offer Code, Shipping Price, Merchandise Price, Order Tax, Order Discount, Order Total, Payment Method, Age, Gender, Shipping Name First, Shipping Name Last, Shipping Address 1, Shipping Address 2, Shipping City, Shipping State/Province, Shipping ZIP/Postal Code, Shipping Country, Shipping Phone Number, Shipping Method, Currency, IP Address, Custom String, Web Analytic Provider, Item 1 SKU, Item 1 Price, Item 1 Quantity, Item 1 Shipping price, Item 1 Indicator Code, Item 1 Discount.

In some embodiments, the inventive systems of the present invention electronically receives web originated activity tracking data from a particular electronic data source (e.g., Piwik). In some embodiments, the inventive systems of the present invention can utilize, for example, a value in a field of "Order ID" to automatically, in real time, verify that the associated web originated activity record is valid. In some embodiments, if the inventive systems of the present invention determines that the Order ID is valid, the inventive systems of the present invention then accepts such web originated activity record for further processing. In some embodiments, any unmatched records can be separately stored in a database until the matching failure is resolved.

In some embodiments, the inventive systems of the present invention can utilize data of a particular web order to match such record to a particular active offer (e.g., a creative identifies a website on which customers can order product(s)/service(s) based on the particular active offer). In some embodiments, the inventive systems of the present invention can utilize a value for the matched web offer to identify product(s)/service(s) (e.g., based on SKU code(s)), and a media length (e.g., a length of creative/commercial). For instance, in some embodiments, the inventive systems of the present invention can utilize automatic lookup from a list of offers to identify the particular active offer.

In some embodiments, the inventive systems of the present invention then tags/flags each record of web originated activity records as being: attributable or non-attributable. In some embodiments, the inventive systems of the present invention can then generate a report (e.g., an electronic output) of non-attributable web originated activity records for further actions such as automatic discovery and correction of errors.

In some embodiments, if needed, the inventive systems of the present invention then performs time adjusting to a particular single uniform time zone.

For example, if the attributably tagged records obtained from a web originated activity data analytics source are already time stamped based on the desired single uniform time zone, then no further time adjustment is needed.

In other scenarios, for example, if the desired single uniform time zone is the U.S. Eastern time zone and the attributably tagged records obtained from a web originated activity data analytics source whose servers log transactions based on the Western time zone in respect to the main time zones of the U.S., or log records in two or more different time zones, then the inventive systems of the present invention would process the attributable web records to be adjusted to the desired single uniform time zone. In some embodiments, the inventive systems of the present invention can use geographic location(s) of where the web data analytics source is located to, automatically and in real time, determine the particular single uniform time zone to which all attributable records need to be adjusted. In some embodiments, the inventive systems of the present invention can utilize one or more of the following parameters to synchronize/adjust to a single uniform time zone (e.g., the U.S. Eastern time zone) airing records, the attributable web originated activity records, or both.

Media Airing Time & Local Time Parameters

In some embodiments, the inventive systems of the present invention can, for example, adjust the airing records (e.g., media agency response records (MARs)) based on a time zone in which a particular airing of the particular creative associated with the particular offer was shown/distributed. For instance, if the desired uniform time zone for synchronizing the airing records and the web originated activity records is the U.S. Eastern time zone, and the airing was shown at 9 A.M. Western Standard Time (WST), the airing time is adjusted to 12 P.M. Eastern Standard Time (EST) in the airing record. If there are two airings in two different time zones (e.g., a $1^{st}$ airing at 9 AM EST and a $2^{nd}$ airing at 9 AM WST), the inventive systems of the present invention can generate a secondary host airing record having the airing time based on the first airing (e.g., 9 AM EST) and the secondary host airing (12 PM EST).

IP Address of a Computer Device Associated with the Web Originated Activity (e.g., Order)

In some embodiments, the inventive systems of the present invention can utilize IP addresses from the web originated activity records to determine if there is a need for time adjustment of the airing records, the web originated activity records (e.g., web order records), or both. In some embodiments, the inventive systems of the present invention can utilize a suitable IP address mapping tool to determine a time zone associated with the particular IP address.

Web Host Location

In some embodiments, the inventive systems of the present invention can identify a geographic location of a web host that is hosting a webpage to which customers are directed by the campaign's airings for placing their orders to determine if there is a need for time adjustment of the airing records, the web originated activity records (e.g., web order records), or both.

After the time adjustment operation(s), if such is needed, in some embodiments, the inventive systems of the present invention would have a dataset of all media airings associated with the particular offer where all times are adjusted to the same time zone. In some embodiments, the inventive systems of the present invention then selects a particular pre-determined time reference window (i.e., a time period ending at the time of the web order and starting at a pre-determined time prior to the web order time) to identify media airings based on length, such as, but is not limited to:

:15/:30—30 Minute Window
:60/:120—2 Hour Window
5 Min—4 Hour Window
28:30—8 Hour Window.

In some embodiments, the inventive systems of the present invention can automatically and in real time select the particular time window and/or a user can utilize at a specifically programmed user graphical interface to select/adjust particular time window. For instance, FIG. 3 shows one example when the 8 hour time window has been applied to identify particular media airings for a particular order placed at P.M., as recorded in Piwik data. In some embodiments, the inventive systems of the present invention can automatically and in real time group media airing records based on two or more pre-determined time windows due to different time lengths for airing particular creative(s).

In some embodiments, the inventive systems of the present invention can select the particular time window and/or a user can utilize at a specifically programmed user graphical interface to select/adjust particular time window. For instance, FIG. 4 shows other examples of other time windows applied based on the length of media airings.

After the group(s) of media airings is/are identified, in some embodiments, the inventive systems of the present invention would utilize an IP address of the web order to determine which area(s) of media coverage to associate with a customer who placed the particular order. In some embodiments, the inventive systems of the present invention can utilize the area groupings such as DMA (Designated Market Area) regions which are the geographic areas in the United States in which local television viewing is measured by The Nielsen Company. For example, a DMA region can be a group of counties that form an exclusive geographic area in which the home market television stations hold a dominance of total hours viewed. In the Nielsen' example, there are 210 DMA regions, covering the entire continental United States, Hawaii, and parts of Alaska.

Figure 6:
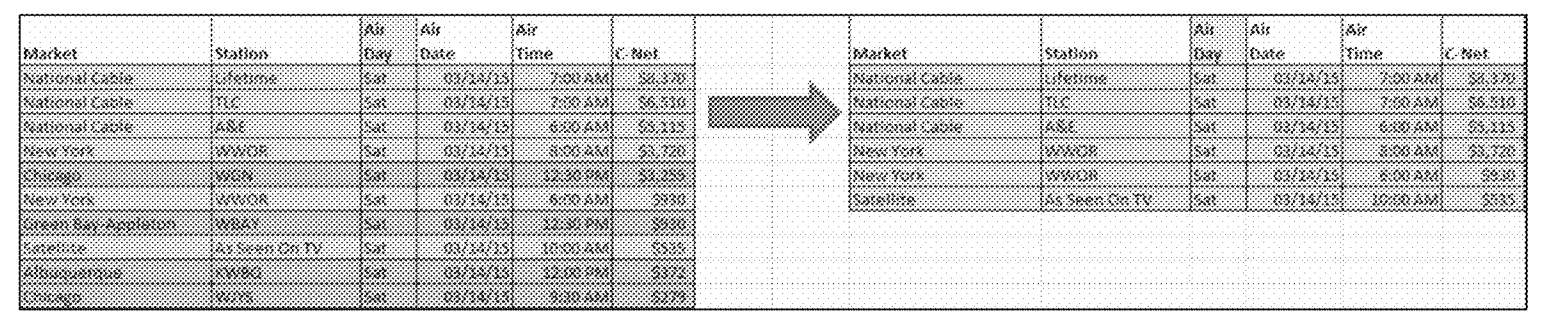

In some embodiments, the inventive systems of the present invention can then use the particular geographic area(s) associated with the customer of the web order to further select for a potential match to media airings within particular time window(s). For example, in case of using DMA regions, in some embodiments, the inventive systems of the present invention can be configured to select media airings which are (1) local to the customer's local DMA and/or (2) national based airings covering all or a few DMA regions which includes the customer's local DMA. For example, FIG. 5, identifies as highlighted airings that will be removed when the customer's DMA is Los Angeles. FIG. 6 also shows another example of filtering out based on customer's geographic location. If an order is placed in the New York DMA on Saturday, Mar. 14, 2015 at 1 PM, as FIG. 6 shows, in some embodiments, the inventive systems of the present invention be configured to select media airings which are:

National Cable airings
Satellite airings
Local airings within the New York DMA.

After the potential media airings are selected based on geographic areas, in some embodiments, as shown in FIG. 7, the inventive systems of the present invention can then use at least one financial parameter (e.g., cost per spot (CPS),) to assign a statistical measure (e.g., weighted probability) of the likelihood that the particular web order is due to a particular media airing. For example, each probability is calculated as a % ratio of net media cost (CPS) of a particular airing (e.g., $10,137 for CNBC) to the cost of all airings ($27,700.05). In some embodiments, the inventive systems of the present invention can use at least one non-financial parameter (e.g., Nielsen Ratings) to assign a statistical measure (e.g., weighted probability) of the likelihood that the particular web order is due to a particular media airing. In some embodiments, the inventive systems of the present invention rounds the probabilities to whole numbers as shown in FIG. 7.

After the statistical measure has been applied, in some embodiments, as shown in FIG. 8, the inventive systems of the present invention can create a database of records in which each media airing entry in FIG. 7 duplicate X times, where X corresponds to the whole number probability associated with the respective media airing, ending with 100 records in total in the database, corresponding to 100 percent. In some embodiments, the inventive systems of the present invention can then utilize a random number generator function to assign a random number between 0 and 1 to each record of the 100 records in the database. FIG. 8 shows a snapshot of such database based on FIG. 7's airings. In some embodiments, the inventive systems of the present invention can then rank 100 records from 1 to 100, where rank 1 is assigned to a record that has a random number that is the closest to 1, and so on. For example, the highest rank is assigned to the last record in FIG. 8, which has the random number of 0.96. In some embodiments, the inventive systems of the present invention then attributes the particular web order to the highest ranked media airing (e.g., CNBC airing at 10:30 AM on Mar. 22, 2015). FIG. 9 shows a snapshot of ranked attributed media airings for multiple transactions.

In some embodiments, the inventive systems of the present invention can continuously re-run the attribution processes if particular condition(s)/trigger(s) is/are met. For example, if a web order is attributed to an airing, which is then removed from the database of MARs in a future update from a media agency, any order(s) which matched the removed airing previously are re-run through the web attribution process to be assigned to a new airing. For example, an airing may be removed from the database of MARs because it did not clear, or did not run, or the offer was decided in future to be non-attributable.

In some embodiments, after the particular web originated activity (e.g., web order) has been attributed to a particular media airing, the inventive systems of the present invention can utilize the attributed transaction for further analysis by systems such as described in the U.S. patent application Ser. No. 14/455,826, entitled "METHODS AND SYSTEMS FOR ANALYZING KEY PERFORMANCE METRICS," whose specific disclosures are hereby incorporated herein by reference in their entirety.

In some embodiments, after the particular web order has been attributed to the particular media airing, the inventive systems of the present invention stores this transaction into a specialized database for further references and data analysis.

In some embodiments, the inventive systems of the present invention can generate various visual real-time updatable reports showing the status of web attribution process on a periodic basis (e.g., day, week, month, etc.).

In some embodiments, the inventive systems of the present invention can generate a cost to acquire, by DMA-based, validation model interactive report and analysis.

In some embodiments, after the particular web order has been attributed to the particular media airing and when Fulfillment data is available, the inventive systems of the present invention matches/identifies at least one fulfillment record matching the web attributed order based, at least in part, on MAR/airing and IP address, and updates its database with URL, Customer Name and Address. In some embodiments, the inventive systems of the present invention, can update the web attributed data based on fulfillment data and utilize the matched record for tracking fulfillment events (e.g., cancellation, future orders, installment payment, etc.).

In some embodiments, the inventive systems of the present invention utilize machine learning feedback to build offer(s) based on web and MAR data.

In some embodiments, the inventive systems of the present invention utilizes two or more web data sources to attribute the particular web order to the particular media airing. In some embodiments, the inventive systems of the present invention utilizes two or more web data sources and fulfillment data to attribute the particular web order to the particular media airing.

Fulfillment Data Feed

In some embodiments, fulfillment data feeds are matched to call center data, web data, media data, based on a plurality of fields such as Order ID, Offer ID, Name & Address, and Order Amount. In some embodiments, the fulfillment data is received with a time delay such as 3-5 business days behind the call center and/or web data. In some embodiments, to match the Call Center Database Record to the Fulfillment Data Feed, the inventive systems of the present invention utilize the match logic that can be based on a plurality of the following fields:

Order Date
Zip (e.g., 5 Digits, 9 digits, 11 digits)
Last Name (e.g., first 5 letters)
Order Amount
Street Name (e.g., first 5 characters).

In some embodiments, once Call Center Data and fulfillment data are matched, the inventive systems of the instant invention automatically assign tags and create master records in the tagging database.

In some embodiments, the inventive computer systems can host a large number of users (e.g., at least 10, at least 100, at least 1,000, at least 10,000; at least 100,000; at least 1,000,000) and perform a large number of concurrent transactions (e.g., at least 1,000, at least 10,000; at least 100,000; at least 1,000,000).

In some embodiments, the inventive computer systems are based on a scalable computer and network architecture that incorporates various strategies for assessing the data, caching, searching, and database connection pooling. An example of the scalable architecture is an architecture that is capable of operating multiple servers. In embodiments, the computing system in accordance with the instant invention may include, but not limiting to, one or more programmed computers, systems employing distributed networking, or other type of system that might be used to transmit and process electronic data.

FIG. 1 depicts a block diagram of an exemplary system 100 in accordance with one or more embodiments. System 100 may include one or more user devices, e.g. user device 120-1, user device 120-2, and user device 120-3, network 130, server 150, database 155, software module 165, and server 180.

The one or more user devices, e.g. user device 120-1, user device 120-2, and user device 120-3, may any type of computing device, including a mobile telephone, a laptop, tablet, or desktop computer having, a netbook, a video game device, a pager, a smart phone, an ultra-mobile personal computer (UMPC), or a personal data assistant (PDA). The one or more user devices may run one or more applications, such as Internet browsers, mobile applications, voice calls, video games, videoconferencing, and email, among others. The one or more user devices may be any combination of computing devices. These devices may be coupled to network 130. Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

Server 150 or server 180 may also be any type of computing device coupled to network 130, including but not limited to a personal computer, a server computer, a series of server computers, a mini computer, and a mainframe computer, or combinations thereof. Server 150 or server 180 may be a web server (or a series of servers) running a network operating system, examples of which may include but are not limited to Microsoft Windows Server, Novell NetWare, or Linux. Server 150 or server 180 may be used for and/or provide cloud and/or network computing. Although not shown in FIG. 1, server 150 and or server 180 may have connections to external systems like email, SMS messaging, text messaging, ad content providers, etc. Any of the features of server 150 may be also implemented in server 180 and vice versa.

Database 155 may be any type of database, including a database managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Software module 165 may be a module that is configured to send, process, and receive information at server 150. Software module 165 may provide another mechanism for sending and receiving data at server 150 besides handling requests through web server functionalities. Software module 165 may send and receive information using any technique for sending and receiving information between processes or devices including but not limited to using a scripting language, a remote procedure call, an email, a tweet, an application programming interface, Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

Although software module 165 may be described in relation to server 150, software module 165 may reside on any other device. Further, the functionality of software module 165 may be duplicated on, distributed across, and/or performed by one or more other devices, either in whole or in part.

Figure 2:
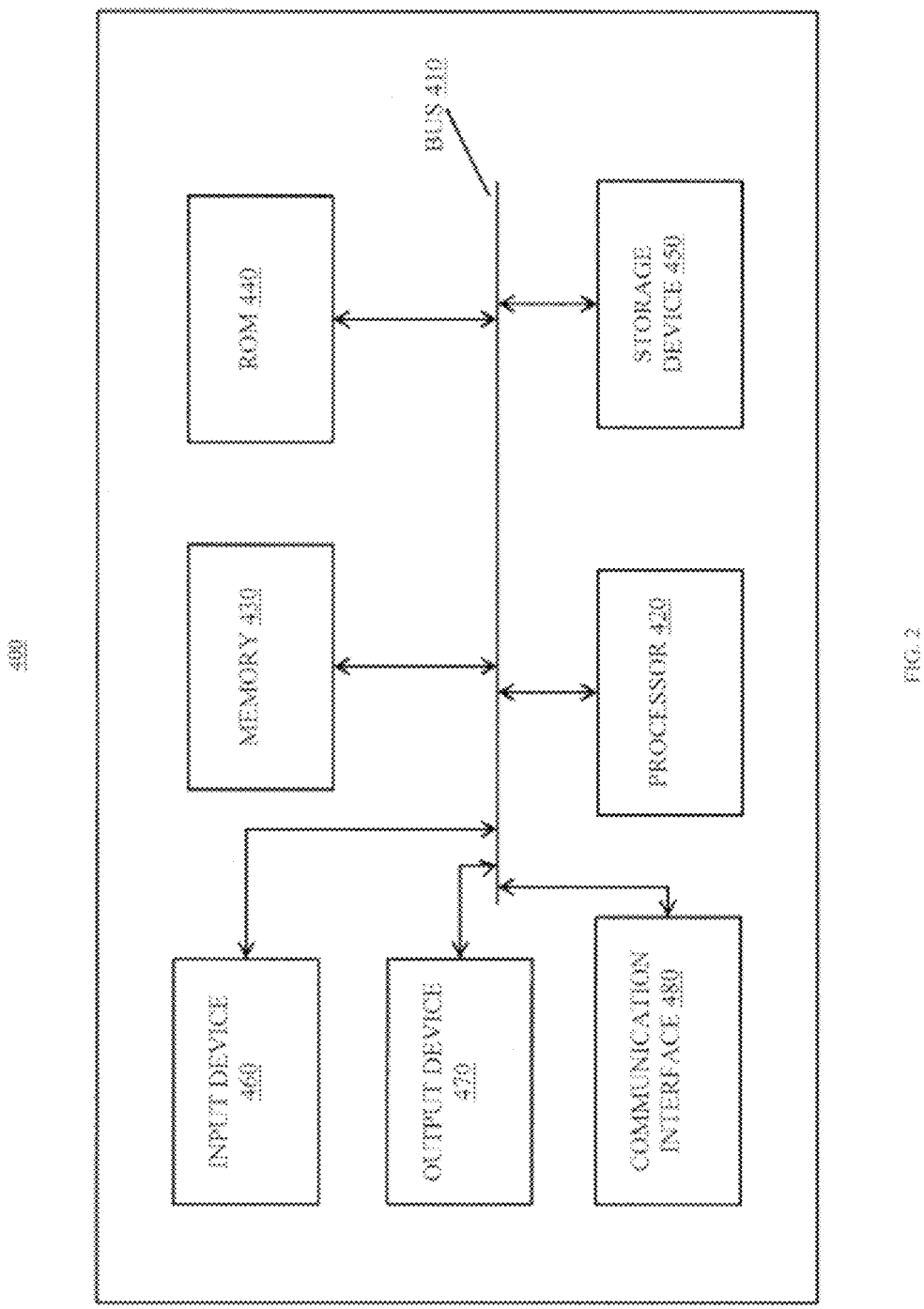
FIG. 2 depicts an exemplary architecture for implementing a computing device in accordance with one or more embodiments.

FIG. 2 depicts an exemplary architecture for implementing a computing device 400 in accordance with one or more embodiments, which may be used to implement any of the computing devices discussed herein, or any other computer system or computing device component thereof. It will be appreciated that other devices that can be used with the computing device 400, such as a client or a server, may be similarly configured. As illustrated in FIG. 4, computing device 400 may include a bus 410, a processor 420, a memory 430, a read only memory (ROM) 440, a storage device 450, an input device 460, an output device 470, and a communication interface 480. Bus 410 may include one or more interconnects that permit communication among the components of computing device 400. Processor 420 may include any type of processor, microprocessor, or processing logic that may interpret and execute instructions (e.g., a field programmable gate array (FPGA)). Processor 420 may include a single device (e.g., a single core) and/or a group of devices (e.g., multi-core). Memory 430 may include a random access memory (RAM) or another type of dynamic storage device that may store information and instructions for execution by processor 420. Memory 430 may also be used to store temporary variables or other intermediate information during execution of instructions by processor 420.

ROM 440 may include a ROM device and/or another type of static storage device that may store static information and instructions for processor 420. Storage device 450 may include a magnetic disk and/or optical disk and its corresponding drive for storing information and/or instructions. Storage device 450 may include a single storage device or multiple storage devices, such as multiple storage devices operating in parallel. Moreover, storage device 450 may reside locally on the computing device 400 and/or may be remote with respect to a server and connected thereto via network and/or another type of connection, such as a dedicated link or channel.

Input device 460 may include any mechanism or combination of mechanisms that permit an operator to input information to computing device 400, such as a keyboard, a mouse, a touch sensitive display device, a microphone, a pen-based pointing device, and/or a biometric input device, such as a voice recognition device and/or a finger print scanning device. Output device 470 may include any mechanism or combination of mechanisms that outputs information to the operator, including a display, a printer, a speaker, etc.

Communication interface 480 may include any transceiver-like mechanism that enables computing device 400 to communicate with other devices and/or systems, such as a client, a server, a license manager, a vendor, etc. For example, communication interface 480 may include one or more interfaces, such as a first interface coupled to a network and/or a second interface coupled to a license manager. Alternatively, communication interface 480 may include other mechanisms (e.g., a wireless interface) for communicating via a network, such as a wireless network. In one implementation, communication interface 480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 400 may perform certain functions in response to processor 420 executing software instructions contained in a computer-readable medium, such as memory 430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments. It is worthy to note that any reference to "one embodiment" or "an embodiment" means that a particular feature, structure, or characteristic described in connection with the embodiment is included in at least one embodiment. The appearances of the phrases "in one embodiment" or "in some embodiments" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

In some embodiments, the present invention is directed to a computer system which includes at least the following components: at least one specifically programmed server; at least one non-transitory web attribution database accessible by the at least one specifically programmed server, where the at least one web attribution database is specifically programmed to be dedicated for use by the at least one specifically programmed server; where the at least one specifically programmed server comprises a plurality of modules configured to perform at least the following operations: electronically and periodically obtaining, over the computer network, by a media data programmed computer interface module of the at least one specifically programmed server, media data from a plurality of computer systems of media data sources, where the media data is associated with a plurality of media airings of a plurality creatives; electronically and periodically obtaining, over a computer network, by a web data programmed computer interface module of the at least one specifically programmed server, web tracking transaction data from a computer system of at least one web tracking electronic source; where the web tracking transaction data including web tracking metrics for web originated activities for at least one website associated with at least one offer of at least one creative; where web originated activities comprise web orders placed in response to the at least one offer associated with the at least one creative; for each web order record in the transactional web data: based on an item identifier of at least one item and a price of the at least one item corresponding to a particular web order corresponding to such web order record, determining, the at least one specifically programmed server, at least one particular offer associated with the particular web order, based on the at least one particular offer, determining, the at least one specifically programmed server, a length of a creative which has used for promoting the at least one item; based on the particular offer, identifying, the at least one specifically programmed server, a subset of media agency records in the media data which are potentially attributable to such particular web order; adjusting, the at least one specifically programmed server, a time of airing for each record in the subset of media agency records based on at least one of: i) a predetermined uniform time zone, and ii) an IP address associated with the web order, and iii) a geographic location of a web host at which the particular web order was placed; based on the length of the creative, selecting, the at least one specifically programmed server, a first subgroup of media agency records from the subset of media agency records, where the length of the creative corresponds to a predetermine time window, where the predetermined time window ends at the time of the particular web order, and continues in the past for a predetermined time duration; based on an IP address of the particular web order from the transactional web data, selecting, the at least one specifically programmed server, a second subgroup of media agency records from the first subgroup of media agency records, where the second subgroup of media agency records correspond to media airings shown in a geographic locality of the particular web order; determining, by the at least one specifically programmed server, for each media airing of the second subgroup, a probability of attribution based on cost of such media airing or viewership rating; based on the probability of attribution, duplicating, by the at least one specifically programmed server, a particular media airing record of the second subgroup X times in the dedicated database to obtain a third subgroup, where X is a whole number based on rounding the probability of attribution; assigning, by the at least one specifically programmed server, to each record in the third subgroup a random value within a predetermined number range between Y1 and Y2, where Y2 is larger than Y1; based on the random value, ranking, by the at least one specifically programmed server, each record in the third subgroup so that a particular media airing having the random value which is the closest to Y2 is assigned the highest rank; attributing, by the at least one specifically programmed server, the particular web order to the particular media airing having the highest rank; and displaying, the at least one specifically programmed server, utilizing at least one graphical user interface, a real time updatable web attribution report.

In some embodiments, the at least one specifically programmed server is further configured to: electronically and real-time obtain, by a fulfillment data programmed computer interface module of the at least one specifically programmed server, from a computer system of at least one fulfillment electronic source, fulfillment transaction data; where the fulfillment transaction data including a plurality of at least thousand fulfillment records associated a plurality of at least thousand fulfillment transactions for the web orders; where each fulfillment record identifies each fulfillment transaction being associated with a particular web order; and matching, in real-time, records between web records and fulfillment records based, at least in part, on: i) an order date, ii) a 5 digit Zip code, iii) a last name, iv) an order amount, and v) optionally, a street name.

In some embodiments, the at least one web tracking electronic source is selected from the group consisting of: Piwik, Google Analytics, and Omniture.

In some embodiments, the length of the creative corresponds to the predetermine time window based on the following rules: i) when the length of the creative is between 15 and 30 seconds, the predetermined time window is 30 minutes, ii) when the length of the creative is between 60 and 120 seconds, the predetermined time window is 2 hours, iii) when the length of the creative is 5 minutes, the predetermined time window is 4 hours, and iv) when the length of the creative is 28 minutes and 30 seconds, the predetermined time window is 8 hours. In some embodiments, Y1 is 0, and Y2 is 1. In some embodiments, the random value is generated by a random value generator. In some embodiments, the predetermined time zone is selected from the group consisting of: U.S. Eastern time zone, U.S. Central time zone, and U.S. Western time zone.

In some embodiments, the media airing is an airing which is selected from the group consisting of: a television station airing, a radio station airing, a video-on-demand airing, a web-promoted offer airing, and a mobile message airing. In some embodiments, the viewership rating is Nielsen rating.

In some embodiments, the present invention is directed to a computer-implemented method which includes at least the following steps: electronically and periodically obtaining, over the computer network, by a media data programmed computer interface module of the at least one specifically programmed server, media data from a plurality of computer systems of media data sources, where the media data is associated with a plurality of media airings of a plurality creatives; electronically and periodically obtaining, over a computer network, by a web data programmed computer interface module of the at least one specifically programmed server, web tracking transaction data from a computer system of at least one web tracking electronic source; where the web tracking transaction data including web tracking metrics for web originated activities for at least one website associated with at least one offer of at least one creative; where web originated activities comprise web orders placed in response to the at least one offer associated with the at least one creative; for each web order record in the transactional web data: based on an item identifier of at least one item and a price of the at least one item corresponding to a particular web order corresponding to such web order record, determining, the at least one specifically programmed server, at least one particular offer associated with the particular web order, based on the at least one particular offer, determining, the at least one specifically programmed server, a length of a creative which has used for promoting the at least one item; based on the particular offer, identifying, the at least one specifically programmed server, a subset of media agency records in the media data which are potentially attributable to such particular web order; adjusting, the at least one specifically programmed server, a time of airing for each record in the subset of media agency records based on at least one of: i) a predetermined uniform time zone, and ii) an IP address associated with the web order, and iii) a geographic location of a web host at which the particular web order was placed; based on the length of the creative, selecting, the at least one specifically programmed server, a first subgroup of media agency records from the subset of media agency records, where the length of the creative corresponds to a predetermine time window, where the predetermined time window ends at the time of the particular web order, and continues in the past for a predetermined time duration; based on an IP address of the particular web order from the transactional web data, selecting, the at least one specifically programmed server, a second subgroup of media agency records from the first subgroup of media agency records, where the second subgroup of media agency records correspond to media airings shown in a geographic locality of the particular web order; determining, by the at least one specifically programmed server, for each media airing of the second subgroup, a probability of attribution based on cost of such media airing or viewership rating; based on the probability of attribution, duplicating, by the at least one specifically programmed server, a particular media airing record of the second subgroup X times in the dedicated database to obtain a third subgroup, where X is a whole number based on rounding the probability of attribution; assigning, by the at least one specifically programmed server, to each record in the third subgroup a random value within a predetermined number range between Y1 and Y2, where Y2 is larger than Y1; based on the random value, ranking, by the at least one specifically programmed server, each record in the third subgroup so that a particular media airing having the random value which is the closest to Y2 is assigned the highest rank; attributing, by the at least one specifically programmed server, the particular web order to the particular media airing having the highest rank; and displaying, the at least one specifically programmed server, utilizing at least one graphical user interface, a real time updatable web attribution report.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

While various exemplary embodiments have been described above, it should be understood that they have been presented by way of example only, and not limitation. Thus, the breadth and scope of the present disclosure should not be limited by any of the above-described exemplary embodiments.

What is claimed is:

1. A computer system, comprising:
   at least one specifically programmed server;
   at least one non-transitory web attribution database accessible by the at least one specifically programmed server, wherein the at least one web attribution database is specifically programmed to be dedicated for use by the at least one specifically programmed server;
   wherein the at least one specifically programmed server is configured to perform at least the following operations:
   dynamically obtaining media events data,
      wherein the media events data is associated with a plurality of media events related to a plurality of creatives;
   dynamically obtaining web tracking transaction data from at least one web tracking electronic source;
      wherein the web tracking transaction data comprising web tracking metrics for web originated activities for at least one website associated with at least one media event associated with at least one creative;
      wherein the web originated activities comprise activities done in response to the at least one media event associated with the at least one creative;
   for each web activity record in the transactional web data:
      determining at least one particular media event associated with the particular web activity;
      determining a length of a creative;
      based on the particular media event, identifying a subset of media events records in the media events data which are potentially attributable to such particular web activity;
      adjusting a time of at least one media event for each record in the subset of media events records;
      based on the length of the creative, selecting a first subgroup of media events records from the subset of media events records, wherein the length of the creative corresponds to a predetermine time window, wherein the predetermined time window ends at the time of the web activity, and continues in the past for a predetermined time duration;
      selecting a second subgroup of media events records from the first subgroup of media events records, wherein the second subgroup of media events records correspond to media events shown in a geographic locality of the particular web activity;
      determining, for each media event of the second subgroup, a probability of attribution based, at least in part, on cost of such particular media event or viewership rating;
      based on the probability of attribution, duplicating a particular media event record of the second subgroup X times in the dedicated database to obtain a third subgroup, wherein X is a whole number based on rounding the probability of attribution;
      assigning to each record in the third subgroup a random value within a predetermined number range between Y1 and Y2, wherein Y2 is larger than Y1;
      based on the random value, ranking, each record in the third subgroup so that a particular media event having the random value which is the closest to Y2 is assigned the highest rank;
      attributing the particular web activity to the particular media event having the highest rank; and
      displaying, utilizing at least one graphical user interface, a real time updatable web attribution report.

2. The computer system of claim 1,
   wherein the web originated activities are web originated orders;
   wherein the at least one specifically programmed server is further configured to:
   electronically and real-time obtain, by a fulfillment data programmed computer interface module of the at least one specifically programmed server, from a computer system of at least one fulfillment electronic source, fulfillment transaction data;
   wherein the fulfillment transaction data comprising a plurality of at least thousand fulfillment records associated a plurality of at least thousand fulfillment transactions for the web originated orders;
   wherein each fulfillment record identifies each fulfillment transaction being associated with a particular web originated order; and
   matching, in real-time, records between web records and fulfillment records based, at least in part, on:
      i) an order date,
      ii) a Zip code,
      iii) a last name,
      iv) an order amount, and
      v) optionally, a street name.

3. The computer system of claim 1, wherein the adjusting the time of the at least one media event for each record in the subset of media events records is based, at least in part, on at least one of:
   i) a predetermined uniform time zone, and
   ii) an IP address associated with the particular web activity, and
   iii) a geographic location of a web host at which the particular web activity was placed.

4. The computer system of claim 1, wherein the length of the creative corresponds to the predetermine time window based on the following rules:
   i) when the length of the creative is between 15 and 30 seconds, the predetermined time window is Z1 value;
   ii) when the length of the creative is between 60 and 120 seconds, the predetermined time window is Z2 value;
   iii) when the length of the creative is 5 minutes, the predetermined time window is Z3 value;
   iv) when the length of the creative is 28 minutes and 30 seconds, the predetermined time window is Z4 value;
   v) wherein the Z1 value is distinct from at least one of the Z2 value, the Z3 value, and the Z4 value;
   vi) wherein the Z2 value is distinct from at least one of the Z1 value, the Z3 value, and the Z4 value;
   vii) wherein the Z3 value is distinct from at least one of the Z1 value, the Z2 value, and the Z4 value; and
   viii) wherein the Z4 value is distinct from at least one of the Z1 value, the Z2 value, and the Z3 value.

5. The computer system of claim 1, wherein Y1 is 0, and Y2 is 1.

6. The computer system of claim 1, wherein the random value is generated by a random value generator.

7. The computer system of claim 1, wherein the predetermined time zone is selected from the group consisting of: U.S. Eastern time zone, U.S. Central time zone, and U.S. Western time zone.

8. The computer system of claim 1, wherein the particular media event is an airing which is selected from the group consisting of: a television station airing, a radio station airing, a video-on-demand airing, a web-promoted offer airing, and a mobile message airing.

9. The computer system of claim 8, wherein the viewership rating is Nielsen rating.

10. A computer-implemented method, comprising:
- dynamically obtaining, by a processor, media events data, wherein the media events data is associated with a plurality of media events related to a plurality of creatives;
- dynamically obtaining, by the processor, web tracking transaction data from at least one web tracking electronic source;
- wherein the web tracking transaction data comprising web tracking metrics for web originated activities for at least one website associated with at least one media event associated with at least one creative;
- wherein web originated activities comprise activities done in response to the at least one media event associated with the at least one creative;
- for each web activity record in the transactional web data:
  - determining, by the processor, at least one particular media event associated with the particular web activity;
  - determining, by the processor, a length of a creative;
  - based on the at least one particular media event, identifying, by the processor, a subset of media events records in the media events data which are potentially attributable to the particular web activity;
  - adjusting, by the processor, a time of at least one media event for each record in the subset of media events records;
  - based on the length of the creative, selecting, by the processor, a first subgroup of media events records from the subset of media events records, wherein the length of the creative corresponds to a predetermine time window, wherein the predetermined time window ends at the time of the particular web activity, and continues in the past for a predetermined time duration;
  - selecting, by the processor, a second subgroup of media events records from the first subgroup of media events records, wherein the second subgroup of media events records correspond to media events shown in a geographic locality of the particular web activity;
  - determining, by the processor, for each media event of the second subgroup, a probability of attribution based, at least in part, on cost of such media event or viewership rating;
  - based on the probability of attribution, duplicating, by the processor, a particular media event record of the second subgroup X times in the dedicated database to obtain a third subgroup, wherein X is a whole number based on rounding the probability of attribution;
  - assigning, by the processor, to each record in the third subgroup a random value within a predetermined number range between Y1 and Y2, wherein Y2 is larger than Y1;
  - based on the random value, ranking, by the processor, each record in the third subgroup so that a particular media event having the random value which is the closest to Y2 is assigned the highest rank;
  - attributing, by the processor, the web activity to the particular media event having the highest rank; and
  - displaying, by the processor, utilizing at least one graphical user interface, a real time updatable web attribution report.

11. The method of claim 10, further comprising:
- electronically and real-time obtaining, by a fulfillment data programmed computer interface module of the at least one specifically programmed server, from a computer system of at least one fulfillment electronic source, fulfillment transaction data;
- wherein the web originated activities are web originated orders;
- wherein the fulfillment transaction data comprising a plurality of at least thousand fulfillment records associated a plurality of at least thousand fulfillment transactions for the web originated orders;
- wherein each fulfillment record identifies each fulfillment transaction being associated with a particular web originated order; and
- matching, in real-time, records between web records and fulfillment records based, at least in part, on:
  - i) an order date,
  - ii) a Zip code,
  - iii) a last name,
  - iv) an order amount, and
  - v) optionally, a street name.

12. The method of claim 10, wherein the adjusting the time of the at least one media event for each record in the subset of media events records is based, at least in part, on at least one of:
- i) a predetermined uniform time zone, and
- ii) an IP address associated with the particular web activity, and
- iii) a geographic location of a web host at which the particular web activity was placed.

13. The method of claim 10, wherein the length of the creative corresponds to the predetermine time window based on the following rules:
- i) when the length of the creative is between 15 and 30 seconds, the predetermined time window is Z1 value;
- ii) when the length of the creative is between 60 and 120 seconds, the predetermined time window is Z2 value;
- iii) when the length of the creative is 5 minutes, the predetermined time window is Z3 value;
- iv) when the length of the creative is 28 minutes and 30 seconds, the predetermined time window is Z4 value;
- v) wherein the Z1 value is distinct from at least one of the Z2 value, the Z3 value, and the Z4 value;
- vi) wherein the Z2 value is distinct from at least one of the Z1 value, the Z3 value, and the Z4 value;
- vii) wherein the Z3 value is distinct from at least one of the Z1 value, the Z2 value, and the Z4 value; and
- viii) wherein the Z4 value is distinct from at least one of the Z1 value, the Z2 value, and the Z3 value.

14. The method of claim 10, wherein Y1 is 0, and Y2 is 1.

15. The method of claim 10, wherein the random value is generated by a random value generator.

16. The method of claim 10, wherein the predetermined time zone is selected from the group consisting of: U.S. Eastern time zone, U.S. Central time zone, and U.S. Western time zone.

17. The method of claim 10, wherein the particular media event is an airing which is selected from the group consisting of: a television station airing, a radio station airing, a video-on-demand airing, a web-promoted offer airing, and a mobile message airing.

18. The method of claim 17, wherein the viewership rating is Nielsen rating.

* * * * *